Feb. 4, 1958 K. W. CATTERMOLE 2,822,520

ELECTRIC PULSE TIME MODULATORS

Filed March 23, 1955

Inventor
K. W. CATTERMOLE
By [signature]
Attorney

United States Patent Office 2,822,520

Patented Feb. 4, 1958

2,822,520

ELECTRIC PULSE TIME MODULATORS

Kenneth William Cattermole, London, England, assignor to International Standard Electric Corporation, New York, N. Y., a corporation of Delaware Application March 23, 1955, Serial No. 496,305

Claims priority, application Great Britain May 14, 1954

7 Claims. (Cl. 332—1)

The present invention relates to pulse time position modulating arrangements for electric pulse communication systems.

One of the frequently used methods of producing a train of time or position modulated pulses depends on the application to a trigger circuit of the modulating signal wave, and a sawtooth wave, whereby a pulse is produced by the trigger circuit when the amplitudes of the signal wave and the sawtooth wave correspond. It is well known that by this arrangement the actual sampling times of the signal wave depend on its amplitude, and are therefore irregular, and this produces harmonic distortion, which, however, can be confined within tolerable limits for ordinary commercial systems without much difficulty.

The principal object of the invention is to provide a pulse position modulating arrangement in which the above-mentioned source of distortion is avoided.

A secondary object is to take advantage of the special properties of crystal triodes for producing a compact pulse position modulator with a very small power consumption. The principal object is achieved according to the invention by providing an electric pulse time position modulating arrangement comprising means for generating a train of short regularly repeated, amplitude modulated sample pulses respectively representing samples of the signal waves of one or more communication channels, means for storing in a reactive device energy corresponding to magnitude of the signal wave sample represented by each sample pulse, and means for applying the said energy to control the time of generation of an output position modulated pulse, whose time position with respect to one of a series of regularly spaced time instants corresponds to the magnitude of the said signal wave sample.

The invention will be described with reference to the accompanying drawing, which shows in Fig. 1 a schematic circuit diagram of an embodiment, and in Fig. 2, some graphical diagrams used to explain the operation of Fig. 1.

Figure 1:
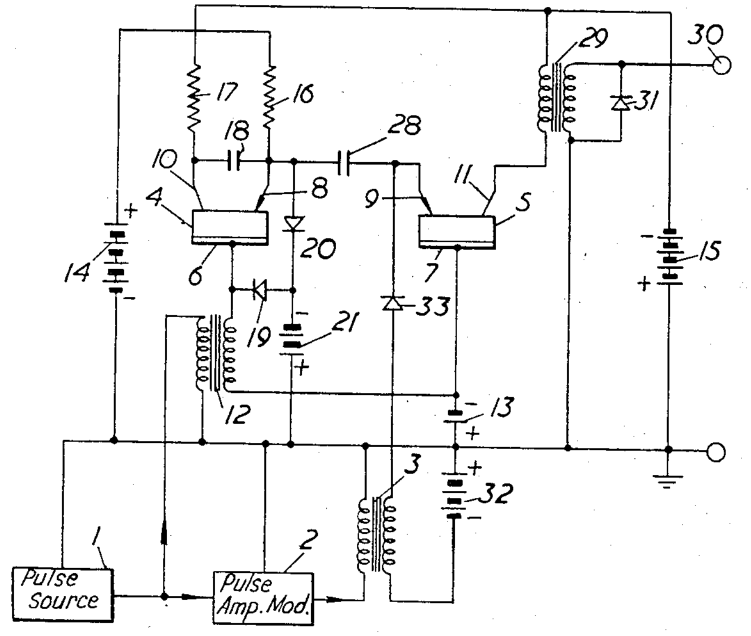

The circuit of Fig. 1 is controlled by a master pulse source 1 which generates a train of short regularly repeated control or gating pulses. These pulses are supplied to a conventional pulse amplitude modulator 2, which produces a train of regularly repeated sample pulses, which may comprise a plurality of individual amplitude modulated channel pulse trains interleaved together, or may represent only a single channel. For the purpose of the present invention the arrangement should be such that the output sample pulses are of greater duration than the control or gating pulses, and preferably the leading edges of a gating pulse and the corresponding sample pulse should at least approximately coincide. The amplitude modulated sample pulses are applied to the pulse position modulator circuit through a transformer 3.

The modulator circuit comprises two crystal triodes 4 and 5 of the point contact type having base electrodes 6 and 7, emitter electrodes (distinguished by arrow-heads) 8 and 9, and collector electrodes 10 and 11. The crystal triodes could however be of any suitable type, so long as the current gain (alpha) of crystal triode 4 is greater than 1. It will be assumed for clearness that the semiconductor forming the body of each crystal triode is of the N-type, but this is not essential.

It should be pointed out that the collector electrode is always easily distinguishable from the emitter electrode in the case of a crystal triode whose current gain (alpha) exceeds 1. However in some junction type crystal triodes for example, in which the current gain is less than 1 the emitter and collector electrodes are not necessarily distinguishable. Therefore, if such a type is used for the crystal triode 5, it will be understood that when the term "collector electrode" is used, it means the output electrode.

In order to clarify the description of the circuit, certain particular values of the operating potentials for the crystal triodes will be assumed, but it will be understood that other suitable values of these potentials may be used. These operating potentials are provided by corresponding direct current sources of any convenient type, each of which has one terminal connected to ground. The source will be called a "positive" or a "negative" source, according as the other terminal is positive or negative.

The crystal triode 4 is used to generate a sawtooth wave which is used, together with the sample pulses from the transformer 3, to control the crystal triode 5, used like a trigger device which generates the corresponding position modulated output pulses.

The control or gating pulses from the source 1 are applied to the crystal triode 4 through a transformer 12, the secondary winding of which is connected between the base electrode 6 and a negative polarising source 13, the potential of which will be assumed to be 12 volts.

The emitter and collector electrodes 8 and 10 are respectively connected to positive and negative polarising sources 14 and 15, each of potential 48 volts, through load resistors 16 and 17, and a capacitor 18 is connected directly between electrodes 8 and 10. The base and emitter electrodes 6 and 8 are respectively connected through rectifiers 19 and 20 to a negative polarising source 21 having a potential of 15 volts. The rectifiers should be directed so that 19 is normally blocked and 20 is normally unblocked. This condition requires that the potential of the source 21 shall be higher than that of the source 13.

It will be seen that, initially, the potential of the emitter electrode 8 will be held at −15 volts by the source 21 through the unblocked rectifier 20, and the potential of the base electrode 6 will be −12 volts as determined by the source 13. Thus the emitter contact is blocked and so the collector current will be very small.

The windings of the transformer 12 should be so connected that the short control pulses from the pulse source 1 will be applied in negative sense to the base electrode 6. When one of these pulses arrives, the negative potential of the base electrode will be increased, but as soon as it reaches −15 volts the rectifier 19 will be unblocked and further change of potential will be prevented by the source 21. Graph A of Fig. 2 shows the variation of the negative potential of the base electrode 6 in response to the application of two successive control pulses from transformer 12.

The leading edge of the triggering pulse 22 of Graph A unblocks the emitter contact of the crystal triode 4, and a relatively large increase in collector current is suddenly produced. A corresponding negative pulse of relatively large amplitude is generated by the collector electrode 10, the potential of which becomes less negative, and causes the coupling capacitor 18 to discharge through the emitter electrode 8. The resulting emitter current is at first sufficient to maintain the collector current. As the discharge current of the capacitor 18 falls, a point is reached where it is no longer adequate to maintain a large collector current, and the potential of the collector electrode 10 starts to become more negative again, so that the emitter current is reduced to zero. The collector current and potential fall rapidly recover their original values. The capacitor 18 being substantially discharged the emitter potential of the emitter electrode 8 falls nearly to that of the collector electrode 10. The sudden fall in the emitter potential is indicated by the vertical leading edge 24, which should preferably be designed to occur approximately at the same time as the trailing edge of the pulse 22. The relatively small fall of the potential at 25 is due to the leading edge of the pulse 22.

After the crystal triode 4 has been cut off in the manner just described, the capacitor 18 begins to charge relatively slowly through the resistors 16 and 17, and the potential of the emitter electrode 8 rises, as indicated by the sloping trailing position 26 of the sawtooth pulse, until its potential reaches −15 volts, at which point the rectifier 20 becomes unblocked and stops any further rise of potential. The same process is repeated in response to the following pulse 27 of Graph A, and so on, for succeeding pulses.

The emitter electrode 9 of the modulating crystal triode 5 is connected to the emitter electrode 8 of the crystal triode 4 through a capacitor 28. The base electrode 7 is connected to the source 13, and the collector electrode 11 is connected to the source 15 through the primary winding of the output transformer 29. The secondary winding of the transformer 29 is connected between ground and an output terminal 30. A rectifier 31 shunts this secondary winding. This rectifier is directed to prevent any negative pulses from reaching terminal 30.

One end of the secondary winding of the transformer 3 is connected to a negative source 32 having a potential of about 30 volts, and the other end is connected through a rectifier 33 to the emitter electrode 9. The windings of the transformer 3 should be so connected that the amplitude modulated sample pulses from the modulator 2 are applied in positive sense to the rectifier 33, which should be directed so that it will be unblocked by the same pulses.

Figure 2:
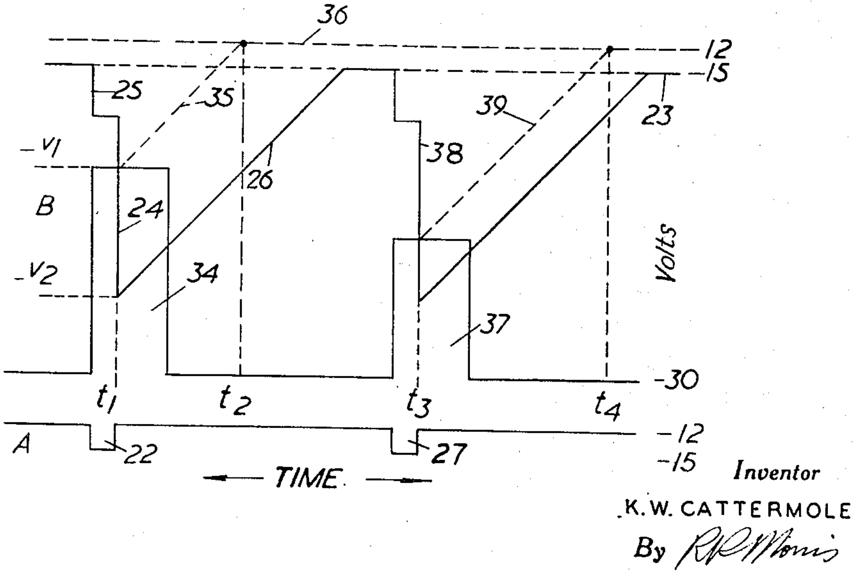

The pulse 34 of Graph B, Fig. 2, represent the sample pulse corresponding to the control pulse 22, which sample pulse is applied to the rectifier 33. It will be seen that this sample pulse partially overlaps the sawtooth wave 24, 26 generated at the emitter electrode 8. It will be noted that at the time $t_1$ when the potential of the emitter electrode 8 is at its lowest value $-v_2$, the potential of the emitter electrode 9 has the higher value $-v_1$ corresponding to the crest of the pulse 34, and accordingly the capacitor is charged to a difference of potential $v_2-v_1$. At time $t_1$, also, the emitter contact of the crystal triode 5 will be blocked because the potential $-v_1$ of the emitter electrode 9 is evidently below the potential of the base electrode 7, which is −12 volts, as determined by the source 13.

As soon as the potential of the emitter electrode 8 begins to increase along the sloping line 26 after time $t_1$, the increase will be communicated to the emitter electrode 9 and will block the rectifier 33. This prevents the capacitor 28 from discharging, and so the potential of the emitter electrode 9 rises from $-v_1$ after time $t_1$ in the manner indicated by the dotted line 35, which is parallel to the line 26. As soon as the potential of the emitter electrode 9 reaches −12 volts (the potential of the base electrode 7), the crystal triode 5 will be unblocked, and the current from the collector electrode 11 suddenly increases and generates a short differential output pulse in the secondary winding of the transformer 29. The windings of this transformer should preferably be connected so that the differential pulse delivered to terminal 30 is positive. The generation of the differential output pulse occurs at the time $t_2$ when the dotted line 35 cuts the dotted abscissa 36 at −12 volts. It will be evident that time interval $t_2-t_1$ varies linearly with the potential $-v_1$ of the crest of the pulse 34, since the slope of the line 35 is fixed.

Another example is shown in Graph B, where the amplitude modulated sample pulse 37 corresponding to the control pulse 27 has a smaller amplitude than the pulse 34. The time interval $t_4-t_3$ between the leading edge 38 of the sawtooth wave and the intersection of the dotted line 39 with the line 36 is now greater than $t_2-t_1$. Thus it will be evident that the output pulses from terminal 30 (Fig. 1), which occur substantially at times such as $t_2$ and $t_4$, will be time or position modulated, and the time excursions of these pulses will be substantially proportional to the variations in the amplitude of the corresponding pulses like 34 and 37.

The potential of the source 32 (Fig.1), and the variations of the amplitude of the sample pulses applied through transformer 3, should be chosen so that there will always be some overlap between these pulses and the sawtooth waves generated by the crystal triode 4, as shown in Graph B, Fig. 2.

If the semiconductor used for the crystal triodes 4 and 5, Fig. 1 is of the P-type, the only modifications required are the reversal of the rectifiers 19, 20 and 33; the reversal of the polarity of the sources 13, 14, 15, 21 and 32; and the reversal of one winding of each of the transformers 3 and 19 so that negative pulses are applied to the rectifier 33 and positive pulses to the base electrode 6. One winding of the transformer 29 should also be reversed if the output position modulated pulses supplied to terminal 30 are to be positive.

As already mentioned, the potentials of the operating sources are not restricted to the particular values assumed above, and the sources do not have to be all separate, but all the potentials required could, for example, be obtained from appropriate tapping points on a single battery or other type of direct current source.

Generally, the potential of the source 21 should be a few volts higher than that of source 13, and the sources 14 and 15 should preferably be of relatively high potential (of the order of 50 volts, for example) so that by the use of relatively large load resistors 16 and 17 the performance of the circuit will be not much affected by variations in the characteristics of the crystal triodes. The potential of the source 32 will usually be between those of the sources 21 and 14.

It will be understood that it is not essential to employ crystal triodes in the circuit of Fig. 1. Any suitable means may be used for generating the sawtooth waves, and any suitable trigger device, or the like, may be used instead of the crystal triode 5 for generating the position modulated pulses.

While the principles of the invention have been described above in connection with specific embodiments, and particular modifications thereof, it is to be clearly understood that this description is made only by way of example and not as a limitation on the scope of the invention.

What I claim is:

1. An electric pulse time position modulating arrangement comprising means for generating a train of short, regularly repeated, amplitude modulated sample pulses respectively representing samples of the signal waves of one or more communication channels, means for storing in a reactive device energy corresponding to the magnitude of the signal wave sample represented by each sample pulse, and means for applying the said energy to control the time of generation of an output position-modulated pulse, whose time position with respect to one of a series of regularly spaced time instants corresponds to the magnitude of the said signal wave sample.

2. An arrangement according to claim 1 in which the said reactive device comprises a capacitor to which are applied each sample pulse, and the corresponding one of a train of sawtooth waves having the same repetition period as the sample pulses, in such manner that the said capacitor acquires a charge which depends on the magnitude of each sample pulse, the said sawtooth waves being applied through the capacitor to a terminal of a trigger device adapted to generate an output position modulated pulse in response to each sample pulse when the potential of the said terminal reaches a specified value.

3. An arrangement according to claim 2 in which the said trigger device comprises a crystal triode.

4. An electric pulse time position modulating arrangement comprising means for generating a train of regularly repeated, amplitude modulated, sample pulses representing samples of the signal waves of one or more communication channels, means for generating a train of sawtooth waves having the same repetition period as the sample pulses, and with steep leading edges followed by inclined trailing portions, a trigger device for generating a train of position modulated pulses corresponding respectively to the sample pulses, means controlled jointly by the leading edge of each sawtooth wave and the corresponding sample pulse for storing a charge in a capacitor connected to a terminal of the trigger device, the magnitude of the charge depending on the amplitude of the sample pulse, means for preventing the discharge of the capacitor at the commencement of the trailing portion of the sawtooth wave, and means for causing the trigger device to discharge the capacitor and to generate a position modulated output pulse when the potential of the said terminal, which varies in response to the said trailing portion, reaches a specified value.

5. An arrangement according to claim 4 in which the sawtooth waves are supplied to the said terminal through the said capacitor, and in which the said means for preventing the discharge of the capacitor comprises a rectifier connected to the said terminal, the sample pulses being applied to the said terminal through the said rectifier.

6. An arrangement according to claim 5 in which the sawtooth waves and the sample pulses are applied to the capacitor respectively in opposite senses, and are so timed and biased that a partial overlap of amplitude occurs between each sample pulse and the corresponding sawtooth wave, the rectifier being directed so that it will be unblocked when the overlap first occurs, whereby the capacitor will acquire a charge determined by the difference between the potentials corresponding to the crests of the sample pulse and the corresponding sawtooth wave.

7. An arrangement according to claim 4 in which the said trigger device is a crystal triode of which the said terminal is the emitter electrode, in which a blocking potential having the specified value is applied to the emitter circuit, and in which the position modulated pulse is generated when the emitter circuit is unblocked, and is derived from the collector circuit of the crystal triode through a differentiating transformer.

References Cited in the file of this patent

UNITED STATES PATENTS

| | | |
|---|---|---|
| 2,467,793 | Wheeler | Apr. 19, 1949 |
| 2,513,308 | Grieg | July 4, 1950 |
| 2,622,212 | Anderson et al. | Dec. 16, 1952 |